United States Patent
Zhu et al.

(10) Patent No.: US 11,825,553 B2
(45) Date of Patent: Nov. 21, 2023

(54) UE CAPABILITY FOR AI/ML

(71) Applicant: QUALCOMM Incorporated, San Diego, CA (US)

(72) Inventors: Xipeng Zhu, San Diego, CA (US); Gavin Bernard Horn, La Jolla, CA (US); Taesang Yoo, San Diego, CA (US); Tingfang Ji, San Diego, CA (US); Rajeev Kumar, San Diego, CA (US); Shankar Krishnan, San Diego, CA (US); Eren Balevi, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/308,970

(22) Filed: May 5, 2021

(65) Prior Publication Data

US 2022/0360973 A1 Nov. 10, 2022

(51) Int. Cl.
*H04W 8/24* (2009.01)
*H04W 76/25* (2018.01)
(Continued)

(52) U.S. Cl.
CPC ............. *H04W 8/24* (2013.01); *G06N 20/00* (2019.01); *H04B 7/0626* (2013.01); *H04W 76/25* (2018.02)

(58) Field of Classification Search
CPC ....... H04W 8/24; H04W 76/25; H04W 24/02; G06N 20/00; G06N 3/04; G06N 3/08; G06N 3/105; G06N 3/084; H04B 7/0626
See application file for complete search history.

(56) References Cited

U.S. PATENT DOCUMENTS 10,952,067 B2 * 3/2021 Wang ................. G06N 3/08
11,564,271 B2 * 1/2023 Tomala ............... H04W 80/02
(Continued)

FOREIGN PATENT DOCUMENTS

WO       2020080989 A1    4/2020
WO   WO-2020080989 A1 *  4/2020   ............. G06N 20/00
(Continued)

OTHER PUBLICATIONS

3GPP TS 35.331: "3rd Generation Partnership Project, Technical Specification Group Radio Access Network, Evolved Universal Terrestrial-Radio Access (E-UTRA), Radio Resource Control (RRC), Protocol Specification (Release 14)", V14.0.0, Sep. 1, 2016 (Sep. 1, 2016), pp. 1-644, XP055543657, paragraph 5.6.3, paragraph 6.3.2.
(Continued)

*Primary Examiner* — Habte Mered
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for a UE capability for AI/ML. A UE may receive a request from a network to report a UE capability for at least one of an AI procedure or an ML procedure. The UE may transmit to the network, based on the request to report the UE capability, an indication of one or more of an AI capability, an ML capability, a radio capability associated with the at least one of the AI procedure or the ML procedure, or a core network capability associated with the at least one of the AI procedure or the ML procedure.

58 Claims, 11 Drawing Sheets

(51) Int. Cl.
      *G06N 20/00*       (2019.01)
      *H04B 7/06*       (2006.01)

(56) References Cited

U.S. PATENT DOCUMENTS

| | | | |
|---|---|---|---|
| 11,611,457 B2 * | 3/2023 | D'Oro | H04L 1/0015 |
| 2020/0366326 A1 * | 11/2020 | Jassal | H04L 41/16 |
| 2021/0297888 A1 * | 9/2021 | Suh | H04W 28/0263 |
| 2022/0287104 A1 * | 9/2022 | Jeon | G06N 20/00 |
| 2022/0338189 A1 * | 10/2022 | Madadi | H04B 7/0626 |

FOREIGN PATENT DOCUMENTS

| | | | | |
|---|---|---|---|---|
| WO | 2021048600 A1 | 3/2021 | | |
| WO | WO-2021048600 A1 * | 3/2021 | | G06N 20/00 |
| WO | 2021064275 A1 | 4/2021 | | |
| WO | WO-2021063500 A1 * | 4/2021 | | G06N 20/00 |
| WO | WO-2021089568 A1 * | 5/2021 | | |

OTHER PUBLICATIONS

International Search Report and Written Opinion—PCT/US2022/023448—ISA/EPO—dated Oct. 6, 2022.

\* cited by examiner

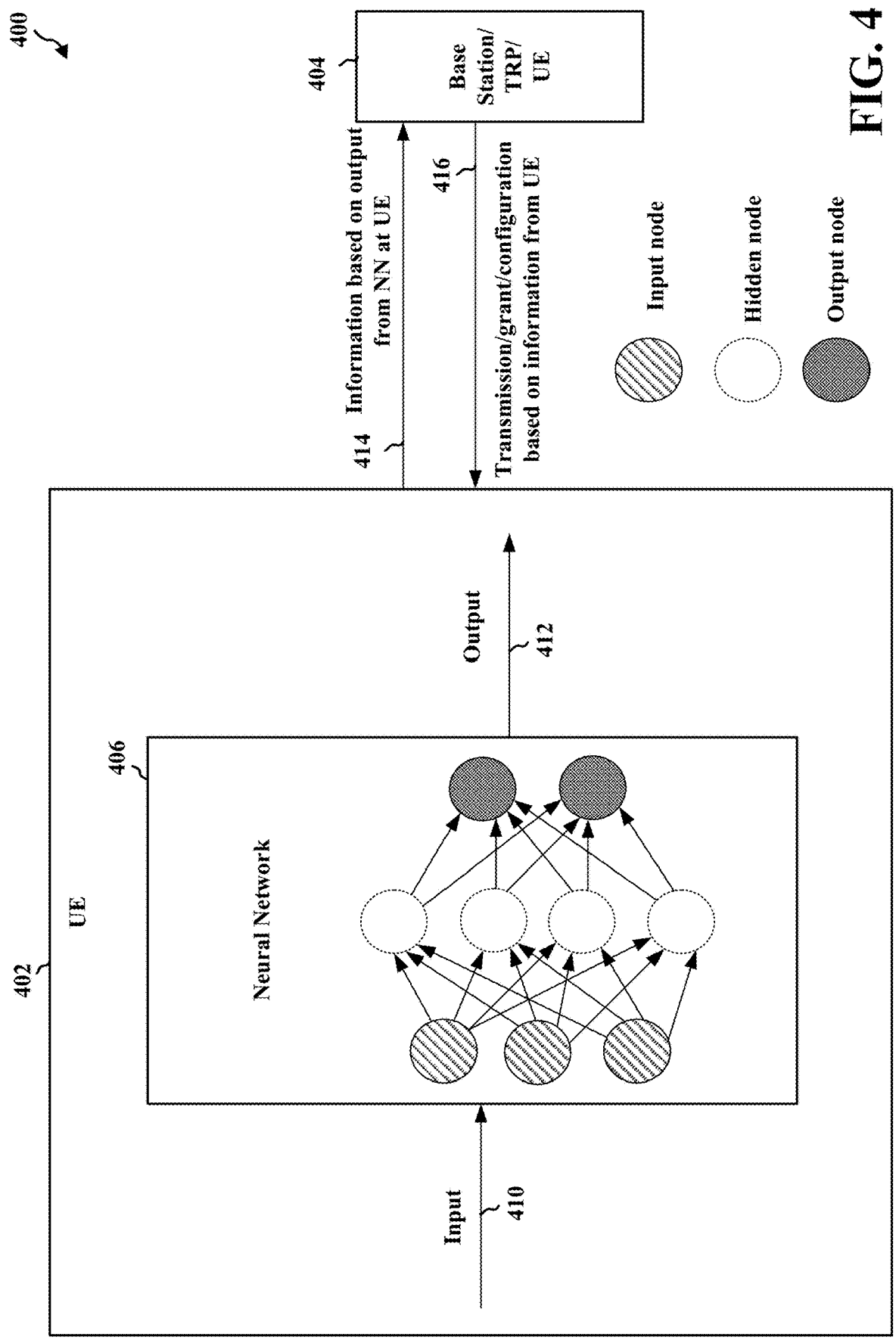

| # | Capability Parameters | Description |
|---|---|---|
| 1 | Processing capability | |
| | a. Training processing capability | TOPS |
| | b. Inference processing capability | TOPS |
| | c. Total processing capability | TOPS |
| 2 | Memory Capability | |
| | a. Maximum model size for training | |
| | b. Maximum model size for inference | |
| 3 | General hardware acceleration capability | |
| | a. AI processor supported for training (Yes/No) | |
| | b. AI processor supported for inference (Yes/No) | |
| | c. Hardware accelerated operations | List of supported operations/instructions (e.g., 2D convolution) |
| 4 | Supported libraries | |
| 5 | Supported model formats | |
| | a. Supported format list | ONNX, TF |
| | b. Model compression (Yes/No) | |
| 6 | Supported models | UE tested and cached model list |
| 7 | Maximum concurrency | |
| | a. Maximum model trainings | Maximum number of concurrent model trainings |
| | b. Maximum model inferences | Maximum number of concurrent model inferences |
| | c. Maximum trainings and inferences | Maximum number of concurrent model trainings and inferences |
| 8 | Model combinations / Tested model combinations | UE_model_a + NW_model_b; UE_model_1 + UE_model_2 + UE_model_3; etc. |
| 9 | Quantization | |
| | a. Data free quantization | |
| | b. Quantization aware training | |

UE CAPABILITY FOR AI/ML

TECHNICAL FIELD

The present disclosure relates generally to communication systems, and more particularly, to a user equipment (UE) capability for artificial intelligence (AI) and machine learning (ML).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a request to report a user equipment (UE) capability for at least one of an artificial intelligence (AI) procedure or a machine learning (ML) procedure; and transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure.

In another aspect of the disclosure, a method, a computer-readable medium, and an apparatus are provided. The apparatus may transmit a request to report a UE capability for at least one of an AI procedure or an ML procedure; and receive, based on the request to report the UE capability, an indication of one or more of an AI capability, an ML capability, a radio capability associated with the at least one of the AI procedure or the ML procedure, or a core network capability associated with the at least one of the AI procedure or the ML procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 illustrates a diagram of a UE that includes a neural network.

FIG. 5 illustrates a table including capability parameters that may be associated with a UE machine learning (ML) capability.

DETAILED DESCRIPTION

Figure 1:
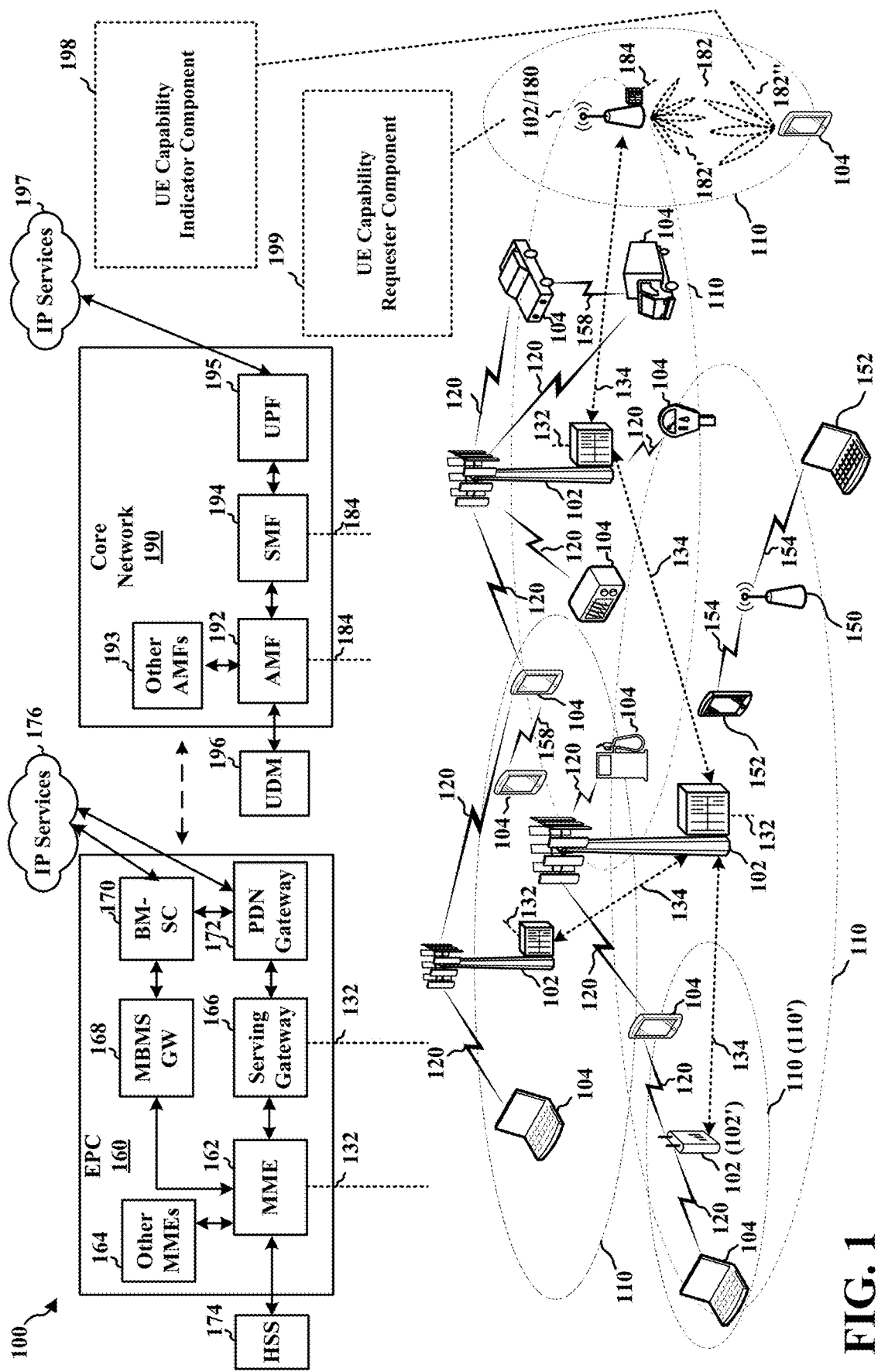
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a UE capability requester component 199 configured to transmit a request to report a UE capability for at least one of an AI procedure or a machine learning (ML) procedure; and receive, based on the request to report the UE capability, an indication of one or more of an AI capability, an ML capability, a radio capability associated with the at least one of the AI procedure or the ML procedure, or a core network capability associated with the at least one of the AI procedure or the ML procedure. In certain aspects, the UE 104 may include a UE capability indicator component 198 configured to receive a request to report a UE capability for at least one of an AI procedure or an ML procedure; and transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure. Although the following description may be focused on 5G NR, the concepts described herein may be applicable to other similar areas, such as LTE, LTE-A, CDMA, GSM, and other wireless technologies.

Figure 2:
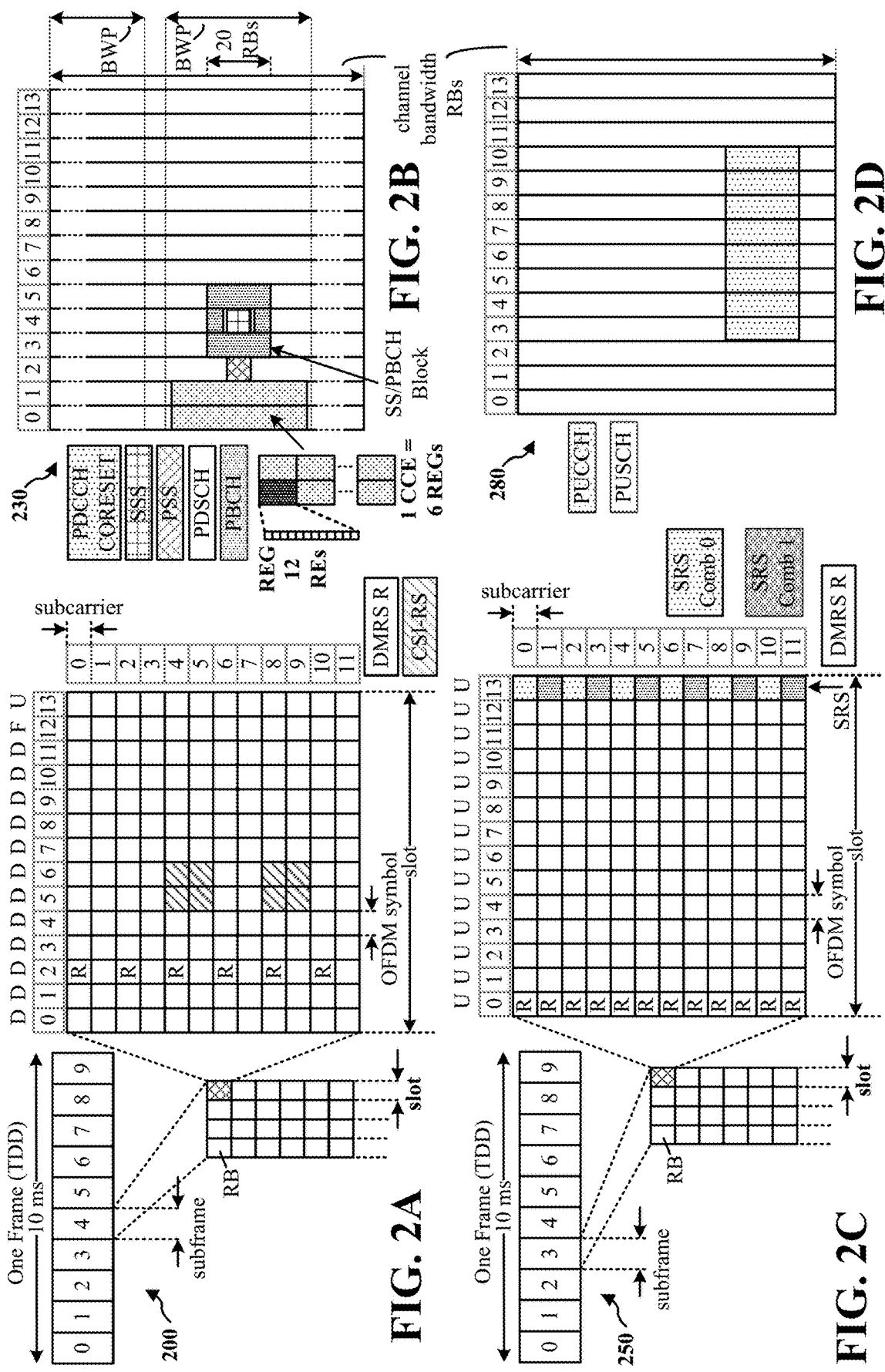
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
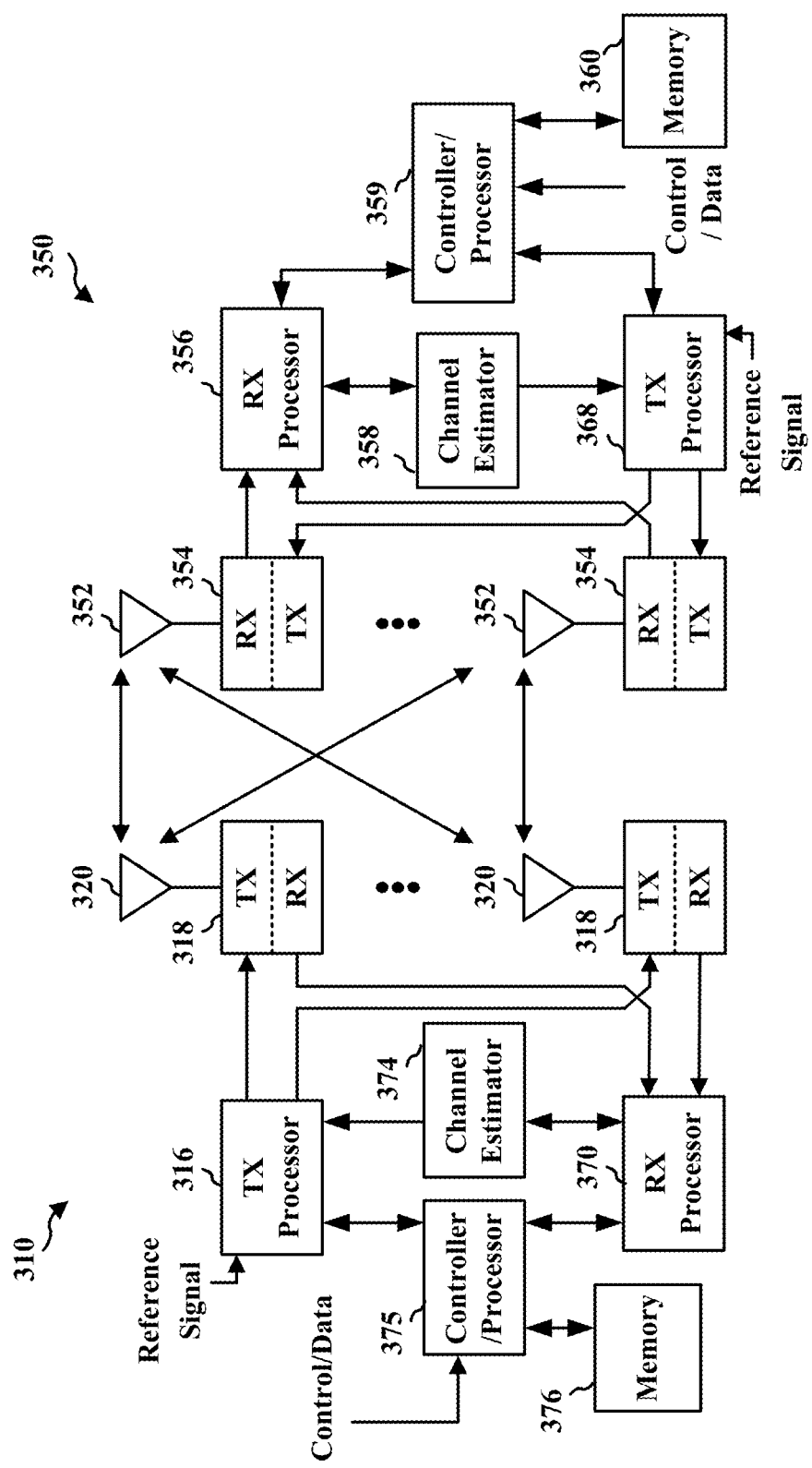
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE capability indicator component 198 of FIG. 1.

At least one of the TX processor 316, the RX processor 370, and the controller/processor 375 may be configured to perform aspects in connection with the UE capability requester component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

A UE may use machine-learning algorithms, deep-learning algorithms, neural networks, or advanced signal processing methods for aspects of wireless communication, e.g., with a base station, a TRP, another UE, etc. In some aspects described herein, an encoding device (e.g., a UE) may train one or more neural networks to learn dependence of measured qualities on individual parameters.

FIG. 4 illustrates a diagram 400 of a UE 402 that includes a neural network 406 configured for determining communications with a second device 404. The second device 404 may be a base station, in some examples. The second device 404 may be a TRP in some examples. The second device 404 may be another UE in some examples, e.g., if the communication between the UE 402 and the second device 404 is based on sidelink.

Among others, examples of machine learning models or neural networks that may be comprised in the UE 402 include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution AxB operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. FIG. 4 illustrates that an example neural network 406 may include a network of interconnected nodes. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network 406 may include any number of nodes and any type of connections between nodes. The neural network 406 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times. As an example, the UE may input information 410 to the neural network 406, and may receive output 412. The UE may report information 414 to the second device 404 based on the output 412. In some aspects, the second device may transmit communication to the UE 402 based on the information 414. In some aspects, the device 404 may be a base station that schedules or configures the UE 402 based on the information 414.

FIG. 5 illustrates a table 500 including capability parameters that may be associated with a UE ML capability. An AI/ML model may be trained based on a function: $Y=F(X)$. In aspects, F, X, and Y may be based on predetermined protocols that a network may determine for configuring a UE in association with the AI/ML model. Two types of radio capabilities associated with a UE may include a UE radio capability and a UE core network capability. The radio capabilities of the UE may be indicative of the function F, which may correspond to a generated function/feature or a predetermined function/feature.

The UE radio capability may be used by the network to determine whether the UE is configured for an AI/ML model-based function. As such, the UE radio capability may include bits that indicate one or more supported functions F of the UE. The bits may correspond to a list of functions that the UE is configured to perform. Each function may be indicated based on one bit. Hence, a function that may have otherwise been performed based on an algorithmic procedure may instead be performed based on procedures of a neural network. In order for the UE to indicate that a particular function F is supported by the UE, the UE may have at least one model tested for the feature. The UE may indicate UE capability bits may for each access stratum (AS) function associated with the AI/ML model.

The UE core network capability may correspond to two capability sub-types including mobility management (MM) and session management (SM). The UE core network capability for MM may be used by the AMF (e.g., AMF 192) to determine whether to use the AI/ML model-based function for the UE on MM. The UE core network capability for SM may be used by the SMF (e.g., SMF 194) to determine whether to use the AI/ML model-based function for the UE on SM. UE capability bits may be indicated for the UE core network capability on MM and/or SM for each MM and/or SM function associated with the AI/ML model. Thus, for the UE core network capability, the function F may be used for both MM and SM. For the UE radio capability, the UE may indicate support for a list of UE-supported functions F, where the functions F may be radio-related functions.

In some aspects, the UE may support a third type of radio that may include a UE AI/ML capability, which may also be referred to as a UE ML capability. The UE ML capability may be based on an ML plane between the UE and the network. The UE ML capability for AI/ML may be used by an AI/ML entity to determine one or more AI/ML function supported by the UE. That is, the capability of the UE may be determined via the UE ML capability.

The UE ML capability may be based on one or more capability parameters, such as any of the example capability parameters indicated in the table 500 in FIG. 5. For example, a first capability parameter may correspond to a processing capability. The processing capability may include a training processing capability, an inference processing capability, and/or a total processing capability. Each type of processing capability may be indicated in terms of a trillion operations per second (TOPS). For example, an AI engine may operate based on 15 TOPS.

A second capability parameter may correspond to a memory capability. The memory capability may include a maximum model size for training and/or a maximum model size for inference. A third capability parameter may correspond to a general hardware acceleration capability, which may be associated with a neural network processor. The general hardware acceleration capability may include determining (e.g., Yes/No) whether an AI processor is available for training. The general hardware acceleration capability may also include determining (e.g., Yes/No) whether the AI processor may be used for inferences. Hardware accelerated operations of the general hardware acceleration capability may be indicated via a list of supported operations/instructions (e.g., based on two-dimensional (2D) convolution). Capability bits may indicate to the neural network processor a list of instructions for ML procedures supported by the UE. A fourth capability parameter may correspond to supported libraries of the UE, which may be indicative of software capabilities of the UE. For example, a particular ML function may be based on a particular library.

A fifth capability parameter may correspond to supported model formats. For instance, supported model formats may include open neural network exchange (ONNX) and/or tensor flow (TF). The supported model formats may be indicated via a supported format list. ML models may also be compressed. Thus, whether the supported model formats include model compression may be further indicated (e.g., Yes/No) via the capability parameter. A sixth capability parameter may correspond to supported models (e.g., based on a UE tested and cached model list). While an ML model may be indicative of a function F(X), a same function F may be supported by different UEs using different models. Thus, the capability parameter may indicate the ML models that are supported by the different UEs.

A seventh capability parameter may correspond to a maximum concurrency, which may include maximum model trainings, maximum model inferences, and/or maximum trainings and inferences. The maximum model trainings may be based on a maximum number of concurrent model trainings that the UE may perform at a same time, the maximum model inferences may be based on a maximum number of current model inferences that the UE may perform at the same time, and the maximum trainings and inferences may be based on a maximum number of total concurrent model trainings and inferences that the UE may perform at the same time. An eighth capability parameter may correspond to model combinations, which may include one or more tested model combinations. If ML models are to be executed concurrently, the UE may indicate the model combinations that the UE supports via a model combinations list. The UE may support a certain number of model combinations, such as UE_model_a+Network_model_b; UE_model_1+UE_model_2+UE_model_3; etc.). Tested model combinations may refer to model combinations that have been confirmed for the UE, although other model combinations that are untested/unconfirmed may also be supported by the UE. A ninth capability parameter may correspond to quantization. For ML model training and inference procedures, the ML model may be converted to a different format to improve an execution efficiency of the ML model. The conversion of the ML model may be referred to as quantization. Quantization may include data free quantization and/or quantization aware training.

Figure 6:
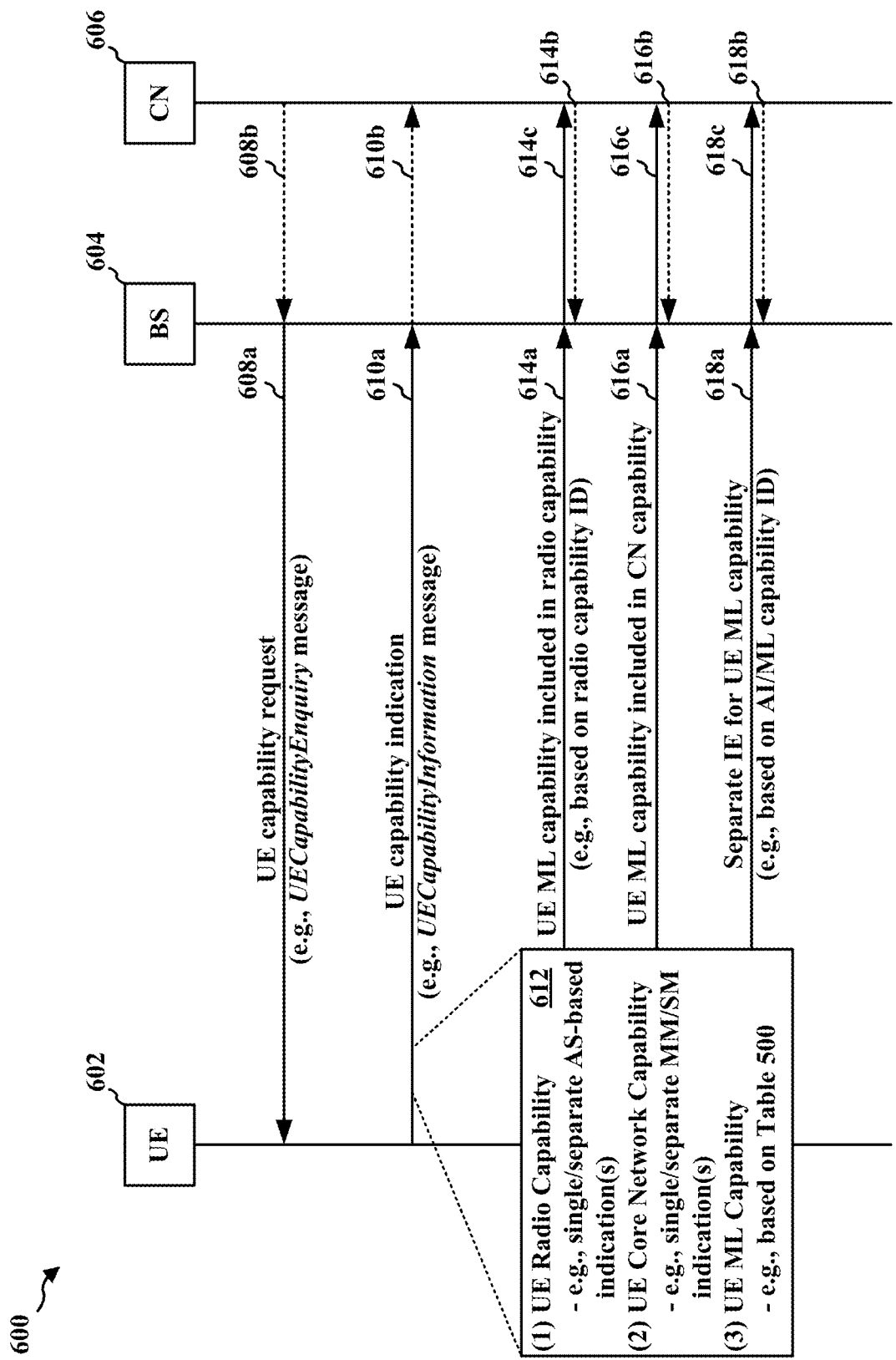
FIG. 6 is a call flow diagram illustrating communications between a UE and network entities.

FIG. 6 is a call flow diagram 600 illustrating communications between a UE 602 and network entities. The network entities may include a base station 604 and a core network entity of a core network 606. At 608*a*, the UE 602 may receive, from the base station 604, a UE capability request for an AI/ML procedure. The UE capability request may correspond to a UECapabilityEnquiry message. The UE capability request may also be received, at 608*a*, based on an indication from the core network 606 (e.g., via the base station 604). At 610*a*, the UE 602 may transmit a UE capability indication to the base station 604. The UE capability indication may correspond to a UECapabilityInformation message. The UE capability request may also be transmitted, at 610*a*, to the core network 606 (e.g., via the base station 604).

The UE capability indication may be associated with a UE capability list 612. The UE capability list 612 may include a UE radio capability 612(1), a UE core network capability 612(2), and a UE ML capability 612(3). The UE radio capability 612(1) may be based on a single or separate AS-based indication(s). The UE core network capability may be based on single or separate MM/SM indication(s). The UE ML capability 612(3) may be based on one or more of the capability parameters indicated in the table 500.

The UE 602 may transmit, at 614a, to the base station 604, the UE ML capability included in the radio capability, which may be further transmitted, at 614c, to the core network 606 via the base station 604. In examples, the UE radio capability may be indicated based on a radio capability identifier (ID). The UE 602 may transmit, at 616a, to the base station 604, the UE ML capability included in the core network (CN) capability, which may be further transmitted, at 616c, to the core network 606 via the base station 604. The UE 602 may transmit, at 618a, to the base station 604, a separate information element (IE) for the UE ML capability, which may be further transmitted, at 618c, to the core network 606 via the base station 604. In examples, the UE ML capability may be indicated based on an AI/ML capability ID.

In configurations where the base station 604 receives UE capability information for the UE 602, which may be indicative of the UE radio capability 612(1), the UE core network capability 612(2), and/or the UE ML capability 612(3), the base station 604 may report (e.g., at 614c, 616c, and/or 618c) the UE capability information to the core network 606. In configurations where the core network 606 receives UE capability information for the UE 602, which may be indicative of the UE radio capability 612(1), the UE core network capability 612(2), and/or the UE ML capability 612(3), the core network 606 may report (e.g., at 614b, 616b, and/or 618b) the UE capability information to the base station 604 that serves the UE 602.

In a first aspect, the UE ML capability 612(3) may be reported, at 614a, via the UE radio capability 612(1). For example, the UE radio capability 612(1) may indicate a supported list of functions that may be performed in association with a neural network, where the UE ML capability 612(3) may correspond to a separate capability. If the UE ML capability 612(3) is signaled within the UE radio capability 612(1), a delivery of the UE ML capability 612(3) may be similar a delivery of the UE radio capability 612(1). The UE 602 may report an ML capability container via RRC to the base station 604 in association with signaling the UE radio capability 612(1). The base station 604 may request, at 608a, the ULE radio capability 612(1) from the UE 602 based on a UECapabilityEnquiry message, and the UE 602 may report, at 610a, the UE radio capability 612(1) based on a UECapabilityInformation message. A filter may be applied for the base station 604 to request, at 608a, the UE ML capability 612(3) individually and/or for the UE 602 to report, at 618a, the ML UE capability 612(3) individually.

The UE radio capability 612(1) may be cached at the core network 606. For example, the UE 602 may report, at 610a, UE capability information to the base station 604, and the base station 604 may relay, at 610b, the UE capability information to the core network 606 for caching the UE capability information. During an RRC connection setup, the core network 606 may transmit (e.g., at 614b, 616b, and/or 618b) the UE capability information to the base station 604. If the core network 606 does not have the UE capability information stored in cache, the base station 604 may request the UE 602 to provide the UE capability information. The base station 604 may report an ML capability container to the core network 606 (e.g., AMF/SMF) for caching/storage during an RRC_IDLE state.

In a second aspect, the UE ML capability 612(3) may be reported, at 616a, via the UE core network capability 612(2). If the UE ML capability 612(3) is reported, at 616a, with the UE core network capability 612(2), a delivery of the UE ML capability 612(3) may be similar a delivery of the UE core network capability 612(2). For example, the UE 602 may report the ML capability container via NAS to the AMF/SMF in association with the UE core network capability 612(2). The UE core network capability 612(2) for MM may be reported to the AMF during a NAS registration procedure. The UE core network capability 612(2) for SM may be reported to the SMF during a PDU session management procedure. The AMF/SMF may transmit the ML capability container to the base station 604, so that the base station 604 may determine the ML capabilities of the UE 602.

In a third aspect, the UE ML capability 612(3) may be reported, at 618a, as a separate capability IE. That is, the UE ML capability 612(3) is not reported with the UE radio capability 612(1) or the UE core network capability 612(2). For example, the ML capability container may be reported to an ML-related network entity/node based on signaling performed over an ML plane. A signaling connection may be established between the UE 602 and the ML-related network entity/node to signal the UE ML capability 612(3). The signaling may be performed via RRC, NAS, U-plane (e.g. hypertext transfer protocol (HTTP)), etc. In configurations, the ML plane may be a separate plane from a control plane (C-plane) or a user plane (U-plane).

In another example, the ML capability container may be reported, at 618a, as a separate IE together with the transmission, at 614a, of the UE radio capability 612(1) in a same signaling procedure as the UE radio capability 612(1), but not via the UE radio capability 612(3). Based on the UECapabilityEnquiry message received, at 608a, from the base station 604, the ML capability container may be an additional IE included in the UECapabilityInformation message transmitted, at 610a, to the base station 604. The UECapabilityEnquiry message may also be configured for the base station 604 to request the ML capability individually. The base station 604 may forward, at 610b, the ML capability container to the 5GC (e.g., AMF/SMF) for caching/storage. In a similar example, the ML capability container may be reported, at 618a, as a separate IE together with the transmission, at 616a, of the UE core network capability 612(2) in a same signaling procedure as the UE core network capability 612(2), but not via the UE core network capability 612(2). The ML capability container may be included as an optional/separate IE in NAS messages that indicate the UE core network capability 612(2). The core network 606 may subsequently forward (e.g., at 614b, 616b, and/or 618b) the ML capability container to the base station 604.

In a further example, an RRC procedure may be defined for UE ML capability requests and reporting, where the base station 604 may forward the ML capability container to the 5GC. In yet a further example, a NAS procedure may be defined for UE ML capability requests and reporting. NAS may correspond to signaling between the UE 602 and the core network 606, such that the NAS procedure may be used to report the UE ML capability 612(3). When the core network 606 receives the UE ML capability 612(3), the core network 606 may forward (e.g., at 614b, 616b, and/or 618b) the ML capability container to the base station 604 for RAN procedures.

Since the core network 606 and the RAN may separately configure the UE 602 based on the ML function, the UE ML capability 612(3) may be shared between AS and NAS. If the UE ML capability 612(3) is reported to the base station 604, the base station 604 may forward, at 610*b*, the UE ML capability 612(3) to the core network 606 (e.g., AMF/SMF). The base station 604 may also indicate a resource split between the RAN and the core network 606 (e.g. based on a maximum processing capability of the core network 606, a maximum memory of the core network 606, etc.). If the UE ML capability 612(3) is reported to the core network 606, the core network 606 may forward (e.g., at 614*b*, 616*b*, and/or 618*b*) the UE ML capability 612(3) to the RAN. The core network 606 may likewise indicate a resource split (e.g. based on a maximum processing capability of the RAN, a maximum memory of the RAN, etc.). The resource/capability split between the RAN and the core network 606 may be determined by the RAN.

In other cases, the resource/capability split may be determined by the UE 602. For example, the UE 602 may split the capability into a UE AS ML capability and a UE NAS ML capability, and report the capabilities respectively to the RAN and the core network 606. The UE 602 may further determine a percentage of the capability to be used for core network-related ML procedures, and a percentage of the capability to be used for RAN-related ML procedures.

A UE radio capability ID may be utilized to reduce a signaling load of the UE capability reporting. For example, UE radio capability reporting of an increased size may be uniquely identified based on a UE radio capability ID, rather than reporting the UE radio capability 612(1). The UE radio capability ID may be communicated via signaling procedures that avoid transmitting the UE radio capability 612(1). When the UE ML capability 612(3) is reported, at 614*a*, via the UE radio capability 612(1), the UE radio capability ID may also indicate the UE ML capability 612(3). When the UE ML capability is reported, at 618*a*, as a separate IE, a UE ML capability ID may be defined to indicate the UE ML capability/container. The UE ML capability 612(3) may be defined via an original equipment manufacturer (OEM) or a mobile network operator (MNO). The UE ML capability ID may be transmitted based on signaling procedures that avoid transmitting the ML capability container. If a wireless receiver (e.g., base station 604, 5GC, ML-related network entity/node, etc.) is not configured for the UE ML capability 612(3) associated with the UE ML capability ID, the wireless receiver may request UE 602 to report the UE ML capability container.

In an example, the UE radio capability 612(1) may include a supported ML feature, such as ML-based channel state information (CSI) feedback. The ML-based CSI feedback may be indicated based on ml-CSIFeedback {CSI type-III, Maximum entropy bit, Maximum bandwidth, Maximum beams, . . . }. Thus, if the ML feature is defined, the UE radio capability 612(1) may include the ML feature. The UE ML capability 612(3) may include a supported model list, a model name/ID (e.g., ml-CSIFeedback-Model), a function ID (e.g., ml-CSIFeedback), and/or other ML capability bits. Such aspects may be associated with function splitting between the UE radio capability 612(1) and the UE ML capability 612(3).

Figure 7:
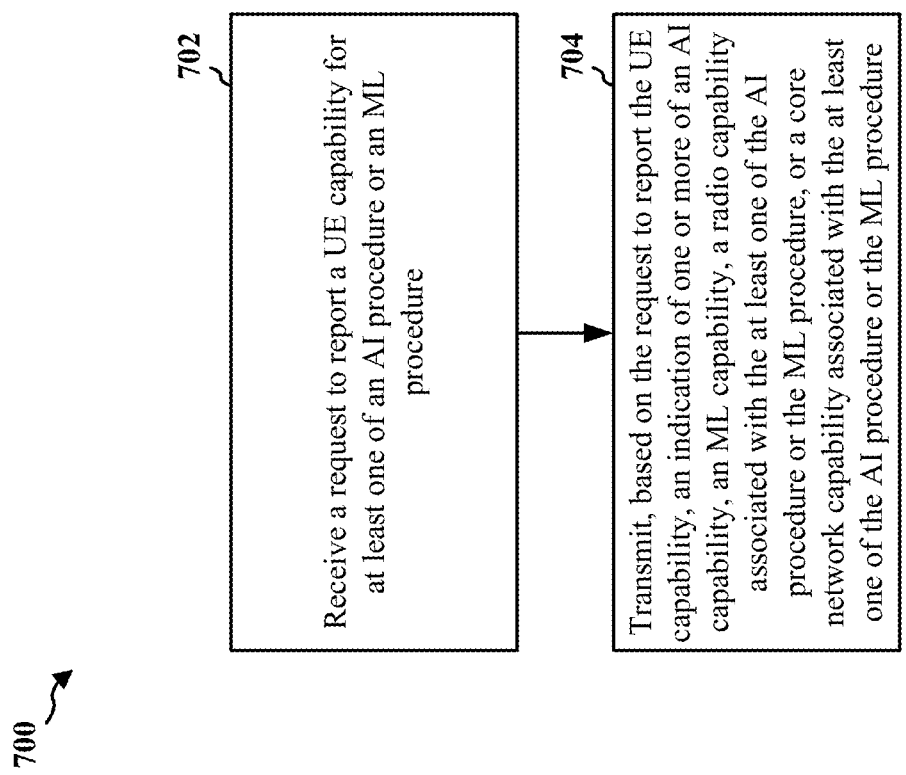
FIG. 7 is a flowchart of a method of wireless communication at a UE.

FIG. 7 is a flowchart 700 of a method of wireless communication. The method may be performed by a UE (e.g., the UE 104, 402, 602; the apparatus 1002; etc.), which may include the memory 360 and which may be the entire UE 104, 402, 602 or a component of the UE 104, 402, 602, such as the TX processor 368, the RX processor 356, and/or the controller/processor 359.

At 702, the UE may receive a request to report a UE capability for at least one of an AI procedure or an ML procedure. For example, referring to FIG. 6, the UE 602 may receive, at 608*a*, a UE capability request from the base station 604/core network 606. In aspects, the UE capability request may be received by the UE 602 based on a UECapabilityEnquiry message.

At 704, the UE may transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure. For example, referring to FIG. 6, the UE 602 may transmit, at 610*a*, a UE capability indication to the base station 604/core network 606. In aspects, the UE capability indication may be indicated by the UE 602 based on a UECapabilityInformation message.

The UE 602 may transmit, at 610*a* (e.g., in association with a capability list 612), at least one of the AI capability or the ML capability based on indicating a capability parameter of the table 500. For instance, the UE 602 may transmit, at 612(3), a UE ML capability that corresponds to at least one of a processing capability, a memory capability, a hardware acceleration capability, a stored library, a stored model format, a stored model, a maximum concurrency capability, a model combination, a tested model combination, or quantization, as indicated in the table 500. The UE 602 may also transmit, at 612(1), the radio capability in association with the at least one of the AI procedure or the ML procedure for one or more AS procedures. The UE 602 may transmit a separate indication, at 614*a*, for each AS function for which the UE 602 supports the AI procedure or the ML procedure. Additionally or alternatively, the UE 602 may transmit, at 612(2), the core network capability for one or more of an MM procedure or an SM procedure. The UE 602 may similarly transmit a separate indication, at 616*a*, for each MM function or SM function for which the UE 602 supports the AI procedure or the ML procedure.

The indication transmitted, at 610*a*, of the at least one of the AI capability or the ML capability may be included in the indication, at 614*a*, of the radio capability. In aspects, the indication, at 614*a*, of the radio capability may be based on a radio capability ID that corresponds to the at least one of the AI capability or the ML capability. The indication of the at least one of the AI capability or the ML capability transmitted, at 610*a*, may be included in the indication, at 616*a*, of the core network capability. In aspects, the indication of the at least one of the AI capability or the ML capability transmitted, at 610*a*, may be transmitted separately, at 618*a*, from the indication, at 614*a*, of the radio capability and the indication, at 616*a*, of the core network capability. The indication of the at least one of the AI capability or the ML capability may be transmitted, at 618*a*, in a separate IE from the indication, at 614*a*, of the radio capability and the indication, at 616*a*, of the core network capability, where the separate IE may be transmitted, at 618*a*, together with or separately from the at least one of the indication, at 614*a*, of the radio capability or the indication, at 616*a*, of the core network capability. The separate IE transmitted, at 618*a*, may include at least one of an AI capability ID or an ML capability ID. At least one of the request received, at 608*a*, to report the UE capability or the indication transmitted, at 610*a*, of the one or more of the AI capability, the ML capability, the radio capability, or the core network capability may be included in an RRC message or a NAS message.

The transmission, at 610*a*, of the indication may include indicating a first portion of the at least one of the AI capability or the ML capability for the AS and indicating a second portion of the at least one of the AI capability or the ML capability for the NAS. The AI capability or the ML capability may correspond to a processing capability or a memory capability, such as the processing capabilities and the memory capabilities indicated in the table 500. In an example, the UE capability transmitted, at 610*a*, may be for CSI feedback.

Figure 8:
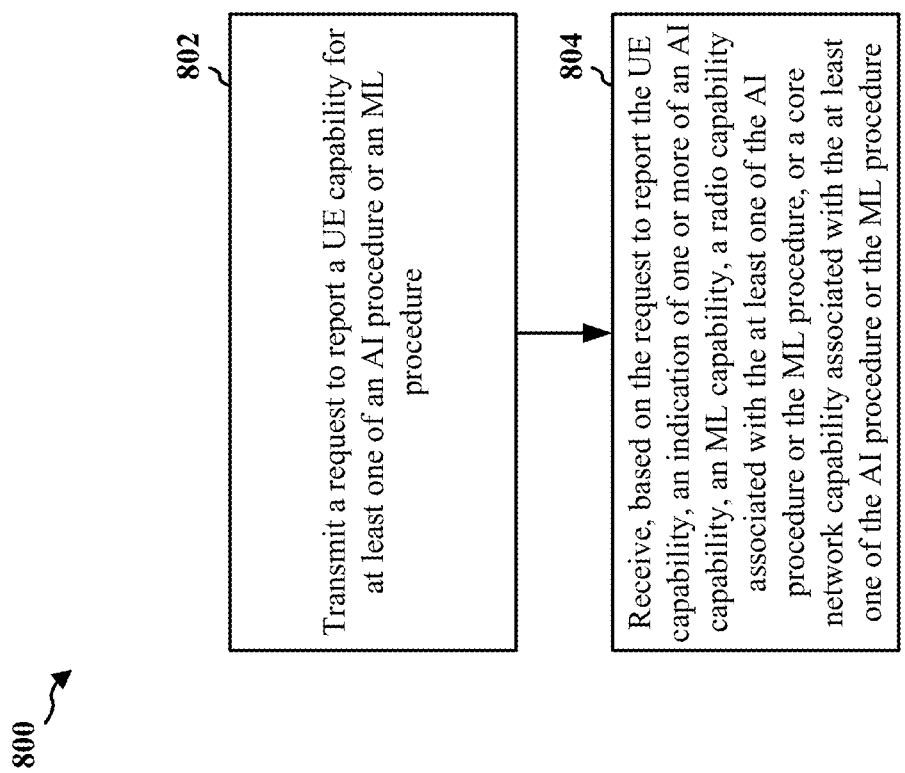
FIG. 8 is a flowchart of a method of wireless communication at a base station.

FIG. 8 is a flowchart 800 of a method of wireless communication. The method may be performed by a network entity (e.g., the base station 102, 404, 604; the core network 606; the apparatus 1102; etc.), which may include the memory 376 and which may be the entire network entity or a component of the network entity, such as the TX processor 316, the RX processor 370, and/or the controller/processor 375.

At 802, the network entity may transmit a request to report a UE capability for at least one of an AI procedure or an ML procedure. For example, referring to FIG. 6, the base station 604/core network 606 may transmit, at 608*a-b*, a UE capability request to the UE 602. In aspects, the UE capability request may be transmitted by the base station 604/core network 606 based on a UECapabilityEnquiry message.

At 804, the network entity may receive, based on the request to report the UE capability, an indication of one or more of an AI capability, an ML capability, a radio capability associated with the at least one of the AI procedure or the ML procedure, or a core network capability associated with the at least one of the AI procedure or the ML procedure. For example, referring to FIG. 6, the base station 604/core network 606 may receive, at 610*a-b*, a UE capability indication from the UE 602. In aspects, the UE capability indication may be received by the base station 604/core network 606 based on a UECapabilityInformation message.

Figure 9:
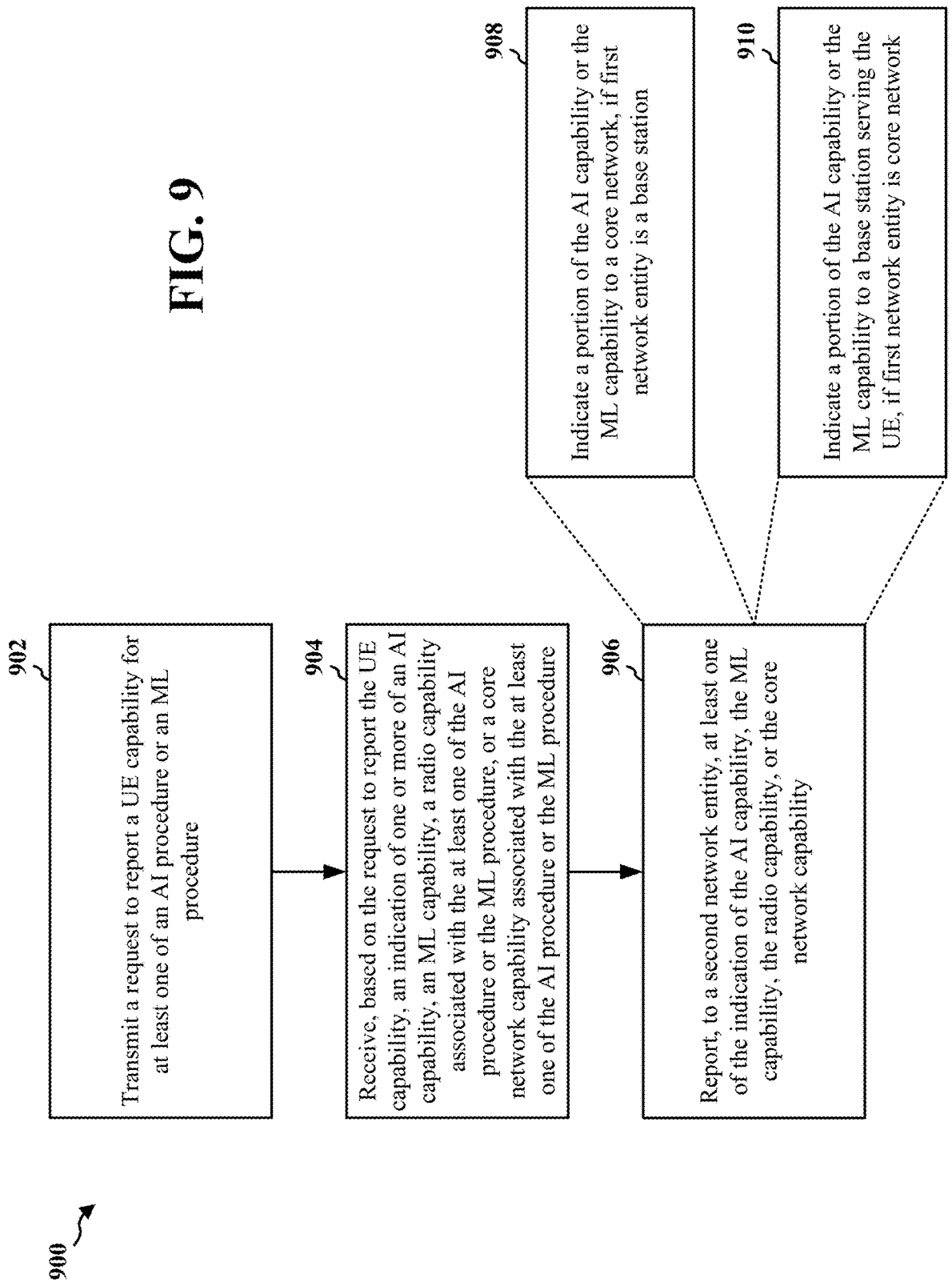
FIG. 9 is a flowchart of a method of wireless communication at a base station.

FIG. 9 is a flowchart 900 of a method of wireless communication. The method may be performed by a network entity (e.g., the base station 102, 404, 604; the core network 606; the apparatus 1102; etc.), which may include the memory 376 and which may be the entire network entity or a component of the network entity, such as the TX processor 316, the RX processor 370, and/or the controller/processor 375.

At 902, the network entity may transmit a request to report a UE capability for at least one of an AI procedure or an ML procedure. For example, referring to FIG. 6, the base station 604/core network 606 may transmit, at 608*a-b*, a UE capability request to the UE 602. In aspects, the UE capability request may be transmitted by the base station 604/core network 606 based on a UECapabilityEnquiry message.

At 904, the network entity may receive, based on the request to report the UE capability, an indication of one or more of an AI capability, an ML capability, a radio capability associated with the at least one of the AI procedure or the ML procedure, or a core network capability associated with the at least one of the AI procedure or the ML procedure. For example, referring to FIG. 6, the base station 604/core network 606 may receive, at 610*a-b*, a UE capability indication from the UE 602. In aspects, the UE capability indication may be received by the base station 604/core network 606 based on a UECapabilityInformation message.

The network entity (e.g., base station 604/core network 606) may receive, at 610*a-b* (e.g., in association with a capability list 612), at least one of the AI capability or the ML capability, which may indicate a capability parameter of the table 500. For instance, the network entity (e.g., base station 604/core network 606) may receive, based on 612(3), a UE ML capability that corresponds to at least one of a processing capability, a memory capability, a hardware acceleration capability, a stored library, a stored model format, a stored model, a maximum concurrency capability, a model combination, a tested model combination, or quantization, as indicated in the table 500. The network entity (e.g., base station 604/core network 606) may also receive, based on 612(1), the radio capability in association with the at least one of the AI procedure or the ML procedure for one or more AS procedures. The network entity (e.g., base station 604/core network 606) may receive a separate indication, at 614*a*/614*c*, for each AS function for which the UE 602 supports the AI procedure or the ML procedure. Additionally or alternatively, the network entity (e.g., base station 604/core network 606) may receive, based on 612(2), the core network capability for one or more of an MM procedure or an SM procedure. The network entity (e.g., base station 604/core network 606) may similarly receive a separate indication, at 616*a*/616*c*, for each MM function or SM function for which the UE 602 supports the AI procedure or the ML procedure. In an example, the UE capability received, at 610*a-b*, may be for CSI feedback.

The indication received, at 610*a-b*, of the at least one of the AI capability or the ML capability may be included in the indication, at 614*a*/614*c*, of the radio capability. In aspects, the indication, at 614*a*/614*c*, of the radio capability may be based on a radio capability ID that corresponds to the at least one of the AI capability or the ML capability. The indication of the at least one of the AI capability or the ML capability received, at 610*a-b*, may be included in the indication, at 616*a*/616*c*, of the core network capability. In aspects, the indication of the at least one of the AI capability or the ML capability received, at 610*a-b*, may be received separately, at 618*a*/618*c*, from the indication, at 614*a*/614*c*, of the radio capability and the indication, at 616*a*/616*c*, of the core network capability. The indication of the at least one of the AI capability or the ML capability may be received, at 618*a*/618*c*, in a separate IE from the indication, at 614*a*/614*c*, of the radio capability and the indication, at 616*a*/616*c*, of the core network capability, where the separate IE may be received, at 618*a*/618*c*, together with or separately from the at least one of the indication, at 614*a*/614*c*, of the radio capability or the indication, at 616*a*/616*c*, of the core network capability. The separate IE received, at 618*a*/618*c*, may include at least one of an AI capability ID or an ML capability ID. At least one of the request transmitted, at 608*a-b*, to report the UE capability or the indication received, at 610*a-b*, of the one or more of the AI capability, the ML capability, the radio capability, or the core network capability may be included in an RRC message or a NAS message.

At 906, the network entity may report, to a second network entity, at least one of the indication of the AI capability, the ML capability, the radio capability, or the core network capability. For example, referring to FIG. 6, the network entity may be the base station 604, which may report, at 610*b*, the UE capability information received, at 610*a*, to the core network 606.

At 908, the network entity may indicate a portion of the AI capability or the ML capability to a core network, if first network entity is a base station. For example, referring to FIG. 6, if the network entity is the base station 604, the network entity may relay, at 614*c*/616*c*/618*c*, UE capability information to the core network 606.

At 910, the network entity may indicate a portion of the AI capability or the ML capability to a base station serving the UE, if first network entity is core network. For example, referring to FIG. 6, if the network entity is the core network 606, the network entity may relay, at 614b/616b/618b, UE capability information to the base station 604.

Figure 10:
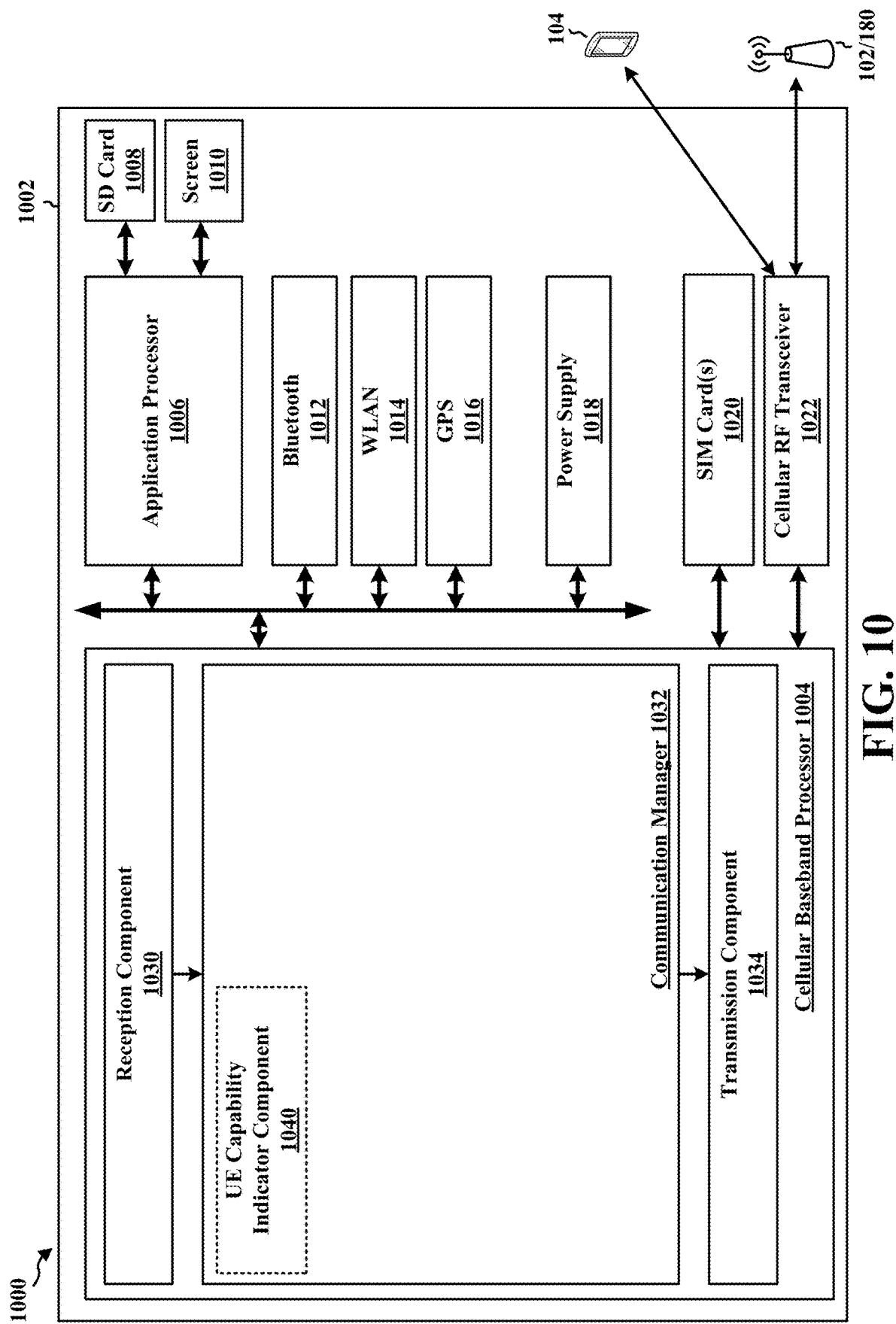
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a UE capability indicator component 1040 that is configured, e.g., as described in connection with 702 and 704, to receive a request to report a UE capability for at least one of an AI procedure or an ML procedure; and to transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure.

The apparatus may include additional components that perform each of the blocks of the algorithm in the flowchart of FIG. 7. As such, each block in the flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving a request to report a UE capability for at least one of an AI procedure or an ML procedure; and means for transmitting, based on the request to report the UE capability, an indication of one or more of an AI capability, an ML capability, a radio capability associated with the at least one of the AI procedure or the ML procedure, or a core network capability associated with the at least one of the AI procedure or the ML procedure. The means for transmitting may be configured to indicate at least one of a processing capability, a memory capability, a hardware acceleration capability, a stored library, a stored model format, a stored model, a maximum concurrency capability, a model combination, a tested model combination, or quantization. The means for transmitting may be further configured to indicate a first portion of the at least one of the AI capability or the ML capability for the AS and indicating a second portion of the at least one of the AI capability or the ML capability for the NAS.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
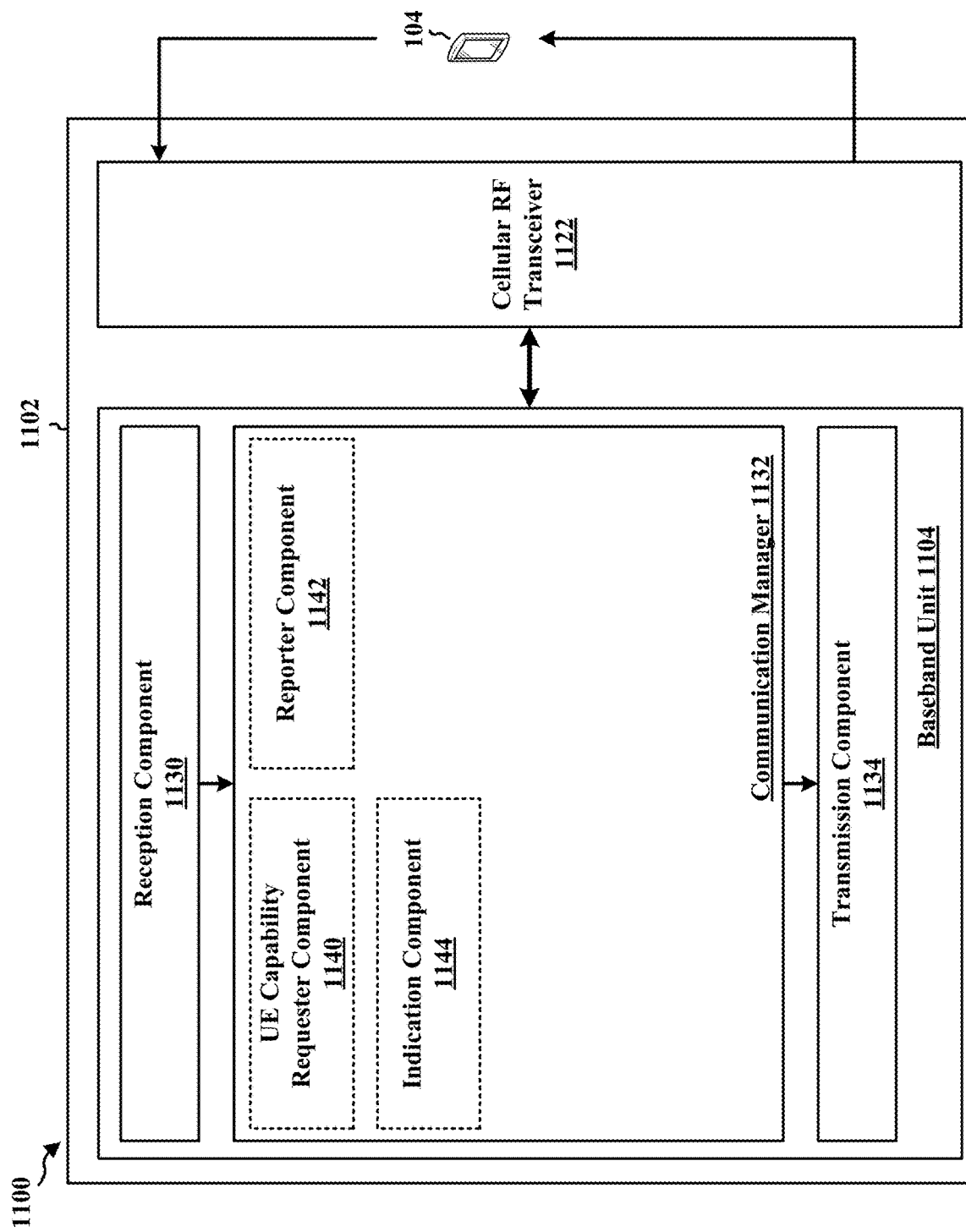
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a UE capability requester component 1140 that is configured, e.g., as described in connection with 802, 804, 902, and 904, to transmit a request to report a UE capability for at least one of an AI procedure or an ML procedure; and to receive, based on the request to report the UE capability, an indication of one or more of an AI capability, an ML capability, a radio capability associated with the at least one of the AI procedure or the ML procedure, or a core network capability associated with the at least one of the AI procedure or the ML procedure. The communication manager 1132 further includes a reporter component 1142 that is configured, e.g., as described in connection with 906, to report, to a second network entity, at least one of the indication of the AI capability, the ML capability, the radio capability, or the core network capability. The communication manager 1132 further includes an indication component 1144 that is configured, e.g., as described in connection with 908 and 910, to indicate a portion of the AI capability or the ML capability to a core network, if first network entity is a base station; and to indicate a portion of the AI capability or the ML capability to a base station serving the UE, if first network entity is core network.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting a request to report a UE capability for at least one of an AI procedure or an ML procedure; and means for receiving, based on the request to report the UE capability, an indication of one or more of an AI capability, an ML capability, a radio capability associated with the at least one of the AI procedure or the ML procedure, or a core network capability associated with the at least one of the AI procedure or the ML procedure. The apparatus 1102 further includes means for reporting, to a second network entity, at least one of the indication of the AI capability, the ML capability, the radio capability, or the core network capability. The apparatus 1102 further includes means for indicating a portion of the AI capability or the ML capability to a core network. The apparatus 1102 further includes means for indicating a portion of the AI capability or the ML capability to a base station serving the UE.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a request to report a UE capability for at least one of an AI procedure or an ML procedure; and transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure.

Aspect 2 may be combined with aspect 1 and includes that the UE transmits at least one of the AI capability or the ML capability, where transmission of the indication indicates at least one of a processing capability, a memory capability, a hardware acceleration capability, a stored library, a stored model format, a stored model, a maximum concurrency capability, a model combination, a tested model combination, or quantization.

Aspect 3 may be combined with any of aspects 1-2 and includes that the UE transmits the radio capability associated with the at least one of the AI procedure or the ML procedure for one or more AS procedures.

Aspect 4 may be combined with any of aspects 1-3 and includes that the UE transmits a separate indication for each AS function for which the UE supports the AI procedure or the ML procedure.

Aspect 5 may be combined with any of aspects 1-4 and includes that the UE transmits the core network capability for one or more of an MM procedure or an SM procedure.

Aspect 6 may be combined with any of aspects 1-5 and includes that the UE transmits a separate indication for each MM function or SM function for which the UE supports the AI procedure or the ML procedure.

Aspect 7 may be combined with any of aspects 1-6 and includes that the indication of at least one of the AI capability or the ML capability is included in the indication of the radio capability.

Aspect 8 may be combined with any of aspects 1-7 and includes that the indication of the at least one of the AI capability or the ML capability included in the indication of the radio capability indicates a radio capability ID that corresponds to the at least one of the AI capability or the ML capability.

Aspect 9 may be combined with any of aspects 1-8 and includes that the indication of at least one of the AI capability or the ML capability is included in the indication of the core network capability.

Aspect 10 may be combined with any of aspects 1-6 and includes that the indication of at least one of the AI capability or the ML capability is transmitted separately from the indication of the radio capability and the indication of the core network capability.

Aspect 11 may be combined with any of aspects 1-6 or 10 and includes that the indication of the at least one of the AI capability or the ML capability is transmitted in a separate IE from the indication of the radio capability and the indication of the core network capability, the separate IE transmitted together with at least one of the indication of the radio capability or the indication of the core network capability.

Aspect 12 may be combined with any of aspects 1-6 or 10-11 and includes that the separate IE includes at least one of an AI capability ID or an ML capability ID.

Aspect 13 may be combined with any of aspects 1-6 or 10-12 and includes that at least one of the request to report the UE capability or the indication of the one or more of the AI capability, the ML capability, the radio capability, or the core network capability is included in an RRC message or a NAS message.

Aspect 14 may be combined with any of aspects 1-13 and includes that transmission of the indication indicates a first portion of the at least one of the AI capability or the ML capability for the AS and indicates a second portion of the at least one of the AI capability or the ML capability for the NAS.

Aspect 15 may be combined with any of aspects 1-14 and includes that the AI capability or the ML capability corresponds to a processing capability or a memory capability.

Aspect 16 may be combined with any of aspects 1-15 and includes that the UE capability is for CSI feedback.

Aspect 17 is an apparatus for wireless communication at a base station including at least one processor coupled to a memory and configured to transmit a request to report a UE capability for at least one of an AI procedure or an ML procedure; and receive, based on the request to report the UE capability, an indication of one or more of an AI capability, an ML capability, a radio capability associated with the at least one of the AI procedure or the ML procedure, or a core network capability associated with the at least one of the AI procedure or the ML procedure.

Aspect 18 may be combined with aspect 17 and includes that the network entity receives at least one of the AI capability or the ML capability indicating at least one of a processing capability, a memory capability, a hardware acceleration capability, a stored library, a stored model format, a stored model, a maximum concurrency capability, a model combination, a tested model combination, or quantization.

Aspect 19 may be combined with any of aspects 17-18 and includes that the network entity receives the radio capability associated with the at least one of the AI capability or the ML capability for one or more AS procedures.

Aspect 20 may be combined with any of aspects 17-19 and includes that the network entity receives a separate indication for each AS function for which the UE supports the AI procedure or the ML procedure.

Aspect 21 may be combined with any of aspects 17-20 and includes that the network entity receives the core network capability for one or more of an MM procedure or an SM procedure.

Aspect 22 may be combined with any of aspects 17-21 and includes that the network entity receives a separate indication for each MM function or SM function for which the UE supports the AI procedure or the ML procedure.

Aspect 23 may be combined with any of aspects 17-22 and includes that the indication of at least one of the AI capability or the ML capability is included in the indication of the radio capability.

Aspect 24 may be combined with any of aspects 17-23 and includes that the indication of the at least one of the AI capability or the ML capability included in the indication of the radio capability indicates a radio capability ID that corresponds to the at least one of the AI capability or the ML capability.

Aspect 25 may be combined with any of aspects 17-24 and includes that the indication of at least one of the AI capability or the ML capability is included in the indication of the core network capability.

Aspect 26 may be combined with any of aspects 17-25 and includes that the indication is received at a base station, and further includes that the at least one processor is configured to report, to a second network entity, at least one of the indication of the AI capability, the ML capability, the radio capability, or the core network capability.

Aspect 27 may be combined with any of aspects 17-22 or 26 and includes that the indication of at least one of the AI capability or the ML capability is received separately from the indication of the radio capability and the indication of the core network capability.

Aspect 28 may be combined with any of aspects 17-22 or 26-27 and includes that the indication of the at least one of the AI capability or the ML capability is received in a separate IE from the indication of the radio capability and the indication of the core network capability, the separate IE received together with at least one of the indication of the radio capability or the indication of the core network capability.

Aspect 29 may be combined with any of aspects 17-22 or 26-28 and includes that the separate IE includes at least one of an AI capability ID or an ML capability ID.

Aspect 30 may be combined with any of aspects 17-22 or 26-29 and includes that at least one of the request to report the UE capability or the indication of the one or more of the AI capability, the ML capability, the radio capability, or the core network capability is based on at least one of an RRC procedure or a NAS procedure.

Aspect 31 may be combined with any of aspects 17-30 and includes that the indication of the at least one of the AI capability or the ML capability is received at a base station, and further includes that the at least one processor is configured to indicate a portion of the AI capability or the ML capability to a core network.

Aspect 32 may be combined with any of aspects 17-30 and includes that the indication of the at least one of the AI capability or the ML capability is received at a core network, and further includes that the at least one processor is configured to indicate a portion of the AI capability or the ML capability to a base station serving the UE.

Aspect 33 may be combined with any of aspects 17-32 and includes that the UE capability is for CSI feedback.

Aspect 34 is a method of wireless communication for implementing any of aspects 1-33.

Aspect 35 is an apparatus for wireless communication including means for implementing any of aspects 1-33.

Aspect 36 is a computer-readable medium storing computer executable code, the code when executed by at least one processor causes the at least one processor to implement any of aspects 1-33.

What is claimed is:

1. An apparatus for wireless communication at a user equipment (UE), comprising:
   memory; and
   at least one processor coupled to the memory and configured to:
   receive a request to report a UE capability for at least one of an artificial intelligence (AI) procedure or a machine learning (ML) procedure; and
   transmit, based on the request to report the UE capability, an indication of one or more of an AI capability, an ML capability, a radio capability associated with the at least one of the AI procedure or the ML procedure, or a core network capability associated with the at least one of the AI procedure or the ML procedure, wherein transmission of the indication indicates a first portion of at least one of the AI capability or the ML capability for an access stratum (AS) and indicates a second portion of the at least one of the AI capability or the ML capability for a non-access stratum (NAS).

2. The apparatus of claim 1, wherein the at least one processor is configured to transmit at least one of the AI capability or the ML capability, and wherein the transmission of the indication indicates at least one of a processing capability, a memory capability, a hardware acceleration capability, a stored library, a stored model format, a stored model, a maximum concurrency capability, a model combination, a tested model combination, or a quantization.

3. The apparatus of claim 1, wherein the at least one processor is configured to transmit the radio capability associated with the at least one of the AI procedure or the ML procedure for one or more AS procedures.

4. The apparatus of claim 3, wherein the at least one processor is configured to transmit a separate indication for each AS function for which the UE supports the AI procedure or the ML procedure.

5. The apparatus of claim 1, wherein the at least one processor is configured to transmit the core network capability for one or more of a mobility management (MM) procedure or a session management (SM) procedure.

6. The apparatus of claim 5, wherein the at least one processor is configured to transmit a separate indication for each MM function or SM function for which the UE supports the AI procedure or the ML procedure.

7. The apparatus of claim 1, wherein the indication of at least one of the AI capability or the ML capability is included in the indication of the radio capability.

8. The apparatus of claim 7, wherein the indication of the at least one of the AI capability or the ML capability included in the indication of the radio capability indicates a radio capability identifier (ID) that corresponds to the at least one of the AI capability or the ML capability.

9. The apparatus of claim 1, wherein the indication of at least one of the AI capability or the ML capability is included in the indication of the core network capability.

10. The apparatus of claim 1, wherein to transmit the indication of at least one of the AI capability or the ML capability, the at least one processor is configured to is transmit the indication of at least one of the AI capability or the ML capability separately from the indication of the radio capability and the indication of the core network capability.

11. The apparatus of claim 10, wherein to transmit the indication of the at least one of the AI capability or the ML capability, the at least one processor is configured to transmit the indication of the at least one of the AI capability or the ML capability in a separate information element (IE) from the indication of the radio capability and the indication of the core network capability, and wherein to transmit the indication of the at least one of the AI capability or the ML capability in the separate IE, the at least one processor is configured to transmit the indication of the at least one of the AI capability or the ML capability in the separate IE together with at least one of the indication of the radio capability or the indication of the core network capability.

12. The apparatus of claim 10, wherein at least one of the request to report the UE capability or the indication of the one or more of the AI capability, the ML capability, the radio capability, or the core network capability is comprised in a radio resource control (RRC) message or a NAS message.

13. The apparatus of claim 1, wherein the UE capability is for channel state information (CSI) feedback.

14. An apparatus for wireless communication at a wireless network, comprising:
    memory; and
    at least one processor coupled to the memory and configured to:
    transmit a request to report a user equipment (UE) capability for at least one of an artificial intelligence (AI) procedure or a machine learning (ML) procedure; and
    receive, based on the request to report the UE capability, an indication of one or more of an AI capability, an ML capability, a radio capability associated with the at least one of the AI procedure or the ML procedure, or a core network capability associated with the at least one of the AI procedure or the ML procedure, wherein reception of the indication indicates a first portion of at least one of the AI capability or the ML capability for an access stratum (AS) and indicates a second portion of the at least one of the AI capability or the ML capability for a non-access stratum (NAS).

15. The apparatus of claim 14, wherein the at least one processor is configured to receive at least one of the AI capability or the ML capability indicating at least one of a processing capability, a memory capability, a hardware acceleration capability, a stored library, a stored model format, a stored model, a maximum concurrency capability, a model combination, a tested model combination, or a quantization.

16. The apparatus of claim 14, wherein the at least one processor is configured to receive the radio capability associated with the at least one of the AI capability or the ML capability for one or more AS procedures.

17. The apparatus of claim 16, wherein the at least one processor is configured to receive a separate indication for each AS function for which the UE supports the AI procedure or the ML procedure.

18. The apparatus of claim 14, wherein the at least one processor is configured to receive the core network capability for one or more of a mobility management (MM) procedure or a session management (SM) procedure.

19. The apparatus of claim 18, wherein the at least one processor is configured to receive a separate indication for each MM function or SM function for which the UE supports the AI procedure or the ML procedure.

20. The apparatus of claim 14, wherein the indication of at least one of the AI capability or the ML capability is included in the indication of the radio capability.

21. The apparatus of claim 20, wherein the indication of the at least one of the AI capability or the ML capability included in the indication of the radio capability indicates a radio capability identifier (ID) that corresponds to the at least one of the AI capability or the ML capability.

22. The apparatus of claim 14, wherein the indication of at least one of the AI capability or the ML capability is included in the indication of the core network capability.

23. The apparatus of claim 14, wherein to receive the indication, the at least one processor is configured to receive the indication at a base station, and wherein the at least one processor is further configured to report, to a network entity, at least one of the indication of the AI capability, the ML capability, the radio capability, or the core network capability.

24. The apparatus of claim 14, wherein to receive the indication of at least one of the AI capability or the ML capability, the at least one processor is configured to receive the indication of the at least one of the AI capability or the ML capability separately from the indication of the radio capability and the indication of the core network capability.

25. The apparatus of claim 24, wherein to receive the indication of the at least one of the AI capability or the ML capability, the at least one processor is configured to receive the indication of the at least one of the AI capability or the ML capability in a separate information element (IE) from the indication of the radio capability and the indication of the core network capability, and wherein to receive the indication of the at least one of the AI capability or the ML capability in the separate 1E, the at least one processor is configured to receive the separate IE together with at least one of the indication of the radio capability or the indication of the core network capability.

26. The apparatus of claim 24, wherein at least one of the request to report the UE capability or the indication of the one or more of the AI capability, the ML capability, the radio capability, or the core network capability is based on at least one of a radio resource control (RRC) procedure or a NAS procedure.

27. The apparatus of claim 14, wherein to receive the indication of the at least one of the AI capability or the ML capability, the at least one processor is configured to receive the indication of the at least one of the AI capability or the ML capability at a base station, and wherein the at least one processor is further configured to indicate a portion of the AI capability or the ML capability to a core network.

28. The apparatus of claim 14, wherein to receive the indication of the at least one of the AI capability or the ML capability, the at least one processor is configured to receive the indication of the at least one of the AI capability or the ML capability at a core network, and wherein the at least one processor is further configured to indicate a portion of the AI capability or the ML capability to a base station serving the UE.

29. The apparatus of claim 14, wherein the UE capability is for channel state information (CSI) feedback.

30. A method of wireless communication at a user equipment (UE), comprising:
receiving a request to report a UE capability for at least one of an artificial intelligence (AI) procedure or a machine learning (ML) procedure; and
transmitting, based on the request to report the UE capability, an indication of one or more of an AI capability, an ML capability, a radio capability associated with the at least one of the AI procedure or the ML procedure, or a core network capability associated with the at least one of the AI procedure or the ML procedure, wherein transmission of the indication indicates a first portion of at least one of the AI capability or the ML capability for an access stratum (AS) and indicates a second portion of the at least one of the AI capability or the ML capability for a non-access stratum (NAS).

31. The method of claim 30, wherein at least one of the AI capability or the ML capability is transmitted, and wherein the transmission of the indication indicates at least one of a processing capability, a memory capability, a hardware acceleration capability, a stored library, a stored model format, a stored model, a maximum concurrency capability, a model combination, a tested model combination, or a quantization.

32. The method of claim 30, wherein the radio capability associated with the at least one of the AI procedure or the ML procedure for one or more AS procedures is transmitted.

33. The method of claim 30, wherein a separate indication for each AS function for which the UE supports the AI procedure or the ML procedure is transmitted.

34. The method of claim 30, wherein the core network capability for one or more of a mobility management (MM) procedure or a session management (SM) procedure is transmitted.

35. The method of claim 34, wherein a separate indication for each MM function or SM function for which the UE supports the AI procedure or the ML procedure is transmitted.

36. The method of claim 30, wherein the indication of at least one of the AI capability or the ML capability is included in the indication of the radio capability.

37. The method of claim 36, wherein the indication of the at least one of the AI capability or the ML capability included in the indication of the radio capability indicates a radio capability identifier (ID) that corresponds to the at least one of the AI capability or the ML capability.

38. The method of claim 30, wherein the indication of at least one of the AI capability or the ML capability is included in the indication of the core network capability.

39. The method of claim 30, wherein transmitting the indication of at least one of the AI capability or the ML capability comprises to transmitting the indication of at least one of the AI capability or the ML capability separately from the indication of the radio capability and the indication of the core network capability.

40. The method of claim 39, wherein transmitting the indication of at least one of the AI capability or the ML capability comprises transmitting the indication of the at least one of the AI capability or the ML capability in a separate information element (IE) from the indication of the radio capability and the indication of the core network capability, and wherein transmitting the indication of the at least one of the AI capability or the ML capability in the separate IE comprises transmitting the indication of the at least one of the AI capability or the ML capability in the separate IE together with at least one of the indication of the radio capability or the indication of the core network capability.

41. The method of claim 39, wherein at least one of the request to report the UE capability or the indication of the one or more of the AI capability, the ML capability, the radio capability, or the core network capability is comprised in a radio resource control (RRC) message or a NAS message.

42. The method of claim 30, wherein the UE capability is for channel state information (CSI) feedback.

43. A method of wireless communication at a wireless network, comprising:
  transmitting a request to report a user equipment (UE) capability for at least one of an artificial intelligence (AI) procedure or a machine learning (ML) procedure; and
  receiving, based on the request to report the UE capability, an indication of one or more of an AI capability, an ML capability, a radio capability associated with the at least one of the AI procedure or the ML procedure, or a core network capability associated with the at least one of the AI procedure or the ML procedure, wherein reception of the indication indicates a first portion of at least one of the AI capability or the ML capability for an access stratum (AS) and indicates a second portion of the at least one of the AI capability or the ML capability for a non-access stratum (NAS).

44. The method of claim 43, wherein at least one of the AI capability or the ML capability is received, and wherein the reception of the indication indicates at least one of a processing capability, a memory capability, a hardware acceleration capability, a stored library, a stored model format, a stored model, a maximum concurrency capability, a model combination, a tested model combination, or a quantization.

45. The method of claim 43, wherein the radio capability associated with the at least one of the AI capability or the ML capability for one or more AS procedures is received.

46. The method of claim 45, wherein a separate indication for each AS function for which the UE supports the AI procedure or the ML procedure is received.

47. The method of claim 43, wherein the core network capability for one or more of a mobility management (MM) procedure or a session management (SM) procedure is received.

48. The method of claim 47, wherein a separate indication for each MM function or SM function for which the UE supports the AI procedure or the ML procedure is received.

49. The method of claim 43, wherein the indication of at least one of the AI capability or the ML capability is included in the indication of the radio capability.

50. The method of claim 49, wherein the indication of the at least one of the AI capability or the ML capability included in the indication of the radio capability indicates a radio capability identifier (ID) that corresponds to the at least one of the AI capability or the ML capability.

51. The method of claim 43, wherein the indication of at least one of the AI capability or the ML capability is included in the indication of the core network capability.

52. The method of claim 43, wherein receiving the indication comprises receiving the indication at a base station, the method further comprising:
  reporting, to a network entity, at least one of the indication of the AI capability, the ML capability, the radio capability, or the core network capability.

53. The method of claim 43, wherein receiving the indication of at least one of the AI capability or the ML capability comprises receiving the indication of the at least one of the AI capability or the ML capability separately from the indication of the radio capability and the indication of the core network capability.

54. The method of claim 53, wherein receiving the indication of the at least one of the AI capability or the ML capability comprises receiving the indication of the at least one of the AI capability or the ML capability in a separate information element (IE) from the indication of the radio capability and the indication of the core network capability, and wherein receiving the indication of the at least one of the AI capability or the ML capability in the separate IE comprises receiving the separate IE together with at least one of the indication of the radio capability or the indication of the core network capability.

55. The method of claim 53, wherein at least one of the request to report the UE capability or the indication of the one or more of the AI capability, the ML capability, the radio capability, or the core network capability is based on at least one of a radio resource control (RRC) procedure or a NAS procedure.

56. The method of claim 43, wherein receiving the indication of the at least one of the AI capability or the ML capability comprises receiving the indication of the at least one of the AI capability or the ML capability at a base station, the method further comprising:
  indicating a portion of the AI capability or the ML capability to a core network.

57. The method of claim 43, wherein receiving the indication of the at least one of the AI capability or the ML capability comprises receiving the indication of the at least one of the AI capability or the ML capability at a core network, the method further comprising:
  indicating a portion of the AI capability or the ML capability to a base station serving the UE.

58. The method of claim 43, wherein the UE capability is for channel state information (CSI) feedback.

* * * * *